Figure 1:
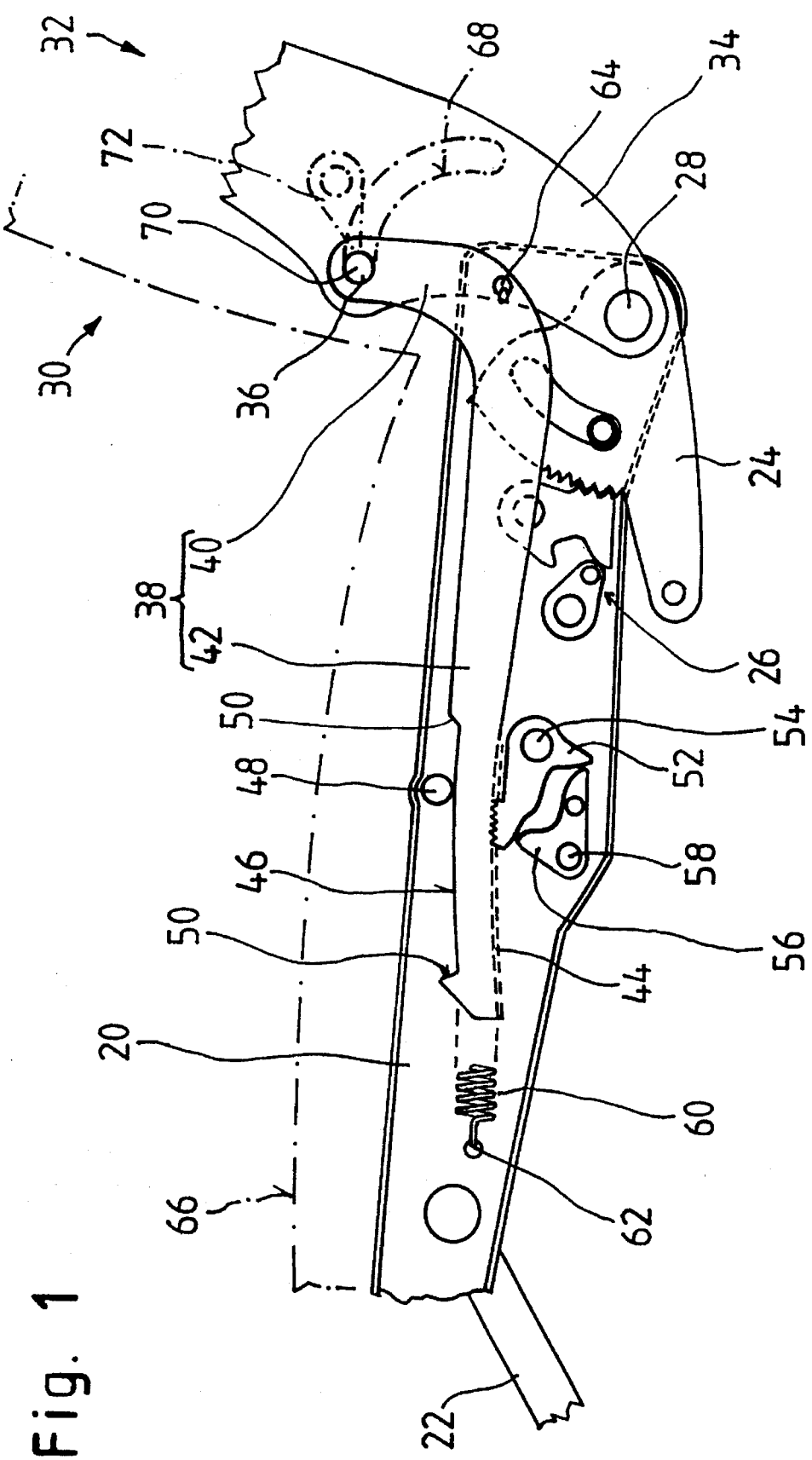

United States Patent [19]
Bauer et al.

[11] Patent Number: 5,466,047
[45] Date of Patent: Nov. 14, 1995

[54] BACK-REST HINGE FOR A VEHICLE SEAT WITH A SEAT SUPPORT AND A BACK-REST HINGED TO IT

[75] Inventors: Heinz Bauer; Burckhard Becker; Ernst-Reiner Frohnhaus, all of Solingen, Germany

[73] Assignee: Firma C. Rob. Hammerstein GmbH, Germany

[21] Appl. No.: 154,213

[22] Filed: Nov. 17, 1993

[30]  Foreign Application Priority Data

Nov. 17, 1992 [DE] Germany ............................ 42 38 756.6
Sep. 7, 1993 [DE] Germany ............................ 43 30 250.5

[51] Int. Cl.⁶ ..................................................... B60N 2/22
[52] U.S. Cl. .................... 297/367; 297/370; 297/372
[58] Field of Search ................................. 297/366–372, 297/378.12

[56] References Cited

U.S. PATENT DOCUMENTS

| | | | |
|---|---|---|---|
| 298,065 | 5/1884 | Bush, Jr. ........................ | 297/370 X |
| 1,821,298 | 9/1931 | Ferreira ........................ | 297/370 |
| 2,066,630 | 1/1937 | Leader et al. ................ | 297/370 |
| 3,133,764 | 5/1964 | Naef ............................ | 297/367 |
| 4,787,593 | 11/1988 | Pipon et al. .................. | 297/344.15 X |

FOREIGN PATENT DOCUMENTS

| | | | |
|---|---|---|---|
| 647598 | 6/1937 | Germany ........................... | 297/367 |
| 1297496 | 2/1970 | Germany. | |
| 1680128 | 11/1971 | Germany. | |
| 3227222 | 5/1984 | Germany. | |
| 3608828 | 10/1987 | Germany. | |
| 3729134 | 3/1989 | Germany. | |

*Primary Examiner*—Peter R. Brown
*Attorney, Agent, or Firm*—Quarles & Brady

[57] ABSTRACT

The back-rest hinge is intended for a vehicle seat with a seat support (20) and a back-rest, which is hinged to this support by means of a swivel joint (shaft 28), and a locking mechanism (44 to 58) for adjusting the angle of inclination of the back-rest (30) in relation to the seat support (20). A locking lever is hinged to the back-rest at a hinge point which is at a distance from the swivel joint along the lengthwise direction of the back-rest (30). The locking lever (38) has a locking area which extends in the direction of the seat support (20) and toward a front edge of this seat support. On the seat support (20) an interlock assembly is provided which interacts with the locking area, can be released, and is normally in mesh (locking lever 52), and with which an activating member is associated (activation lever 56).

17 Claims, 2 Drawing Sheets

BACK-REST HINGE FOR A VEHICLE SEAT WITH A SEAT SUPPORT AND A BACK-REST HINGED TO IT

The invention relates to a back-rest hinge for a vehicle seat with a seat support and a back-rest, which is hinged to this support by means of a swivel joint, and a locking device for adjusting the angle of inclination of the back-rest in relation to the seat support.

The back-rest hinge of this type previously known from DE 32 27 222 A1 is provided with a tumble gear driven by a hand wheel. This is located for the most part co-axially to the swivel joint. Thus the locking of the above-mentioned back-rest hinge occurs in the immediate vicinity of the swivel joint.

Other back-rest hinges are known from DE 37 29 134 A1, DE 16 80128 C1, and DE 12 97 496 C1. In these back-rest hinges too, the locking device and the control are located co-axially to the swivel joint.

Now, in vehicle seats with a manual height-adjustment device, the control for this height-adjustment device is in many cases located near the swivel joint of the back-rest. As a consequence both controls, i.e. the one for the back-rest hinge and the one for the height-adjustment device, lie relatively close together. In actual embodiments this close proximity leads to awkward solutions, and in particular to solutions that are costly and difficult to assemble.

Furthermore, an effort is made to orient and design the longitudinal guideway, along which a vehicle seat is oriented so that it can be moved and adjusted longitudinally in relation to the underbody, i.e. the actual supporting elements of a vehicle seat, with a smaller lateral separation than has previously been the case. The reason for this is that wider tunnels are needed for catalytic converters, and therefore the tunnel-sided rails of a vehicle seat must be moved further outwards, i.e. toward the door. This in turn leads to a narrower construction of the seat as a whole. Yet in spite of a narrower construction, the seat must have the same stability as before.

At this point the invention comes into its own. It has the object of further developing a back-rest hinge of the type mentioned initially in such a way that the locking device is located at a considerable distance from the swivel joint, so that the control of the back-rest hinge can be moved further forward, toward the front edge of the seat, where it is easier to reach, and where in addition more advantageous lever arms are available for locking.

Starting out from the back-rest hinge of the type mentioned initially, this object is achieved by a locking lever hinged to the back-rest at a hinge point, the hinge point being at a distance from the swivel joint along the longitudinal axis of the back-rest, the locking lever having a locking area which extends in the direction of the seat support and toward a front edge of this seat support, and a catch provided on the seat support which interacts with the locking area, can be released, and is normally in mesh, and with which an activating element is associated.

The back-rest support is still hinged to the seat support. However, the locking does not occur at the swivel joint itself, but rather via the locking lever, which acts on the back-rest support at a distance from the swivel joint, and which is locked far in front of the swivel joint (looking toward the front edge of the seat). In this way the locking device and thus also the control of the back-rest hinge can be located roughly in the middle of the longitudinal dimension of the vehicle seat. Consequently it is located at a sufficient distance from other adjustment devices, for example those for the height of the rear edge of the seat, the adjustment of a head-rest, etc.. Besides, the locking forces are conveniently channelled into the seat support.

The particular advantage of the invention lies, however, in the fact that the lever arms used for locking the back-rest are relatively long, in any case considerably longer than in the prior art. Thus it is possible to obtain a considerably stiffer locking action with the same consumption of material. In practice, this means that material can be used more economically. Moreover, the back-rest hinge according to the invention is relatively simple in construction; it requires relatively few parts, which are moreover simple to produce; for example they may be punched parts.

The locking area may be constructed in any desired way; for example it may be constructed as a toothed rack or a threaded rack, or having notches or notched openings like the ones known for, e.g., the longitudinal-adjustment devices of vehicle seats.

It has proved to be advantageous for the hinge point, at which the locking lever acts on the back-rest support, to be located above the swivel joint at a distance measured vertically from it. In this case, the swivel joint may be hinged relatively far down on the seat support, and the back-rest support need not have a downward-pointing extension for the hinging of the locking lever.

In another embodiment it has proved advantageous to have the locking lever act on an extension which protrudes from the swivel joint in the opposite direction of the actual back-rest. In the normal operating position it thus protrudes downwards. This embodiment has the advantage that the swivel joint may be placed relatively high on the seat support; for this purpose, the latter preferably has an upward-pointing extension in its rear area. In this case there is more freedom of motion at the rear of the vehicle seat, underneath the back-rest upholstery; for the extension and the locking lever can be arranged in such a way that even in the most extreme vertical position of the back-rest the hinge point of the locking lever at the extension slides backwards as little as possible, and thus does not reduce the clearance there.

It has proved to be especially advantageous to construct the locking lever in an L-shape; in this case it consists of two shanks, one of which runs essentially parallel to the back-rest support and will subsequently be referred to as the "vertical shank", and the other of which runs essentially parallel to the seat support and will subsequently be referred to as the "horizontal shank". Both shanks lie at an angle to each other that is close to 90 degrees. Through the L-shaped construction, the locking device and particularly the locking lever are located almost entirely within the seat support and the back-rest support, so that the locking lever is located behind or under a passenger's back and backside. This is particularly advantageous for sitting in a seat with a narrow seat support and a narrow back-rest support, because in these two cases the locking lever of each side is located for the most part underneath the passenger.

In the case of an L-shaped construction of the locking lever, the horizontal shank can be made relatively long; its length essentially determines the distance between the locking device and the swivel joint. The same holds true for an essentially straight-lined construction of the locking lever; here too, the locking device may be moved forward relatively far from the swivel joint. This, in turn, means great constructive freedom in terms of where to place the back-rest hinge control. Such constructive freedom, leading to a great flexibility in placing the back-rest hinge control, does not exist in the prior art.

In a further, preferred embodiment, the locking area is curved. Preferentially, it is curved around a virtual focal point, which is displaced forward by the effective length of the locking lever and corresponds to the swivel joint (shaft 28). Because of this curvature of the locking area, the teeth of the locking area always lie in the same direction in relation to the locking device, independently of the position of the back-rest, so that the locking device can be fixedly mounted onto the seat support. A swivel connection around a swivel point is thus not necessary for the locking mechanism. Consequently the locking forces can be channelled into the seat support via the locking mechanism in a considerably more efficient manner; also, the construction of the locking device becomes simpler.

The back-rest hinge according to the invention can be employed both in hand-operated back-rest adjustment devices and in motor-driven back-rest hinge adjustment devices. In the case of hand-operated adjustment devices for the back-rest hinge, a toothed rack at the horizontal shank is advantageous for the locking process. It can be locked by means of a hand-operated pinion, by means of a pin-wheel adjustment mechanism (see, e.g., DE 36 08 828 C2), or by means of a toothed gear (see below). In motorised adjustment devices, it is also possible to design the locking area at the horizontal shank in the form of a rack and a pinion actuator in which case the pinion would be motor-driven. Designs of the locking area in the form of a threaded rack meshing with a nut, which is motor-driven or manually rotatable but not slidable with respect to the seat support, have, however, also proved effective.

A back-rest hinge is provided on each of the two sides of the seat in a well-known manner; both hinges are synchronised by means of a transfer mechanism extending transversely (e.g. a shaft), and have a shared control, typically located on the side of the seat facing the vehicle wall.

It has proved to be very advantageous to provide a spring lifting the back-rest, which on the one side acts on the locking lever and on the other side on the seat support and elastically prestresses the locking lever in such a way that it is pressed against a stop provided on the seat support. The locking lever can move with respect to this stop along the longitudinal axis of the seat support. Thus the adjustment of the back-rest is simplified. To adjust the back-rest to a more vertical position, a passenger only needs to release the locking mechanism of the back-rest hinge via the control; the back-rest then swivels automatically as far forward as the passenger permits it to by pressing his/her back against it. To adjust the back-rest further backward, the passenger, after releasing the locking mechanism, presses his/her back against the back-rest until the desired position has been reached. At the same time, the lifting spring makes the whole arrangement rattleproof.

Further advantages and features of the invention are revealed in the remaining claims and the following description of an embodiment of the invention, not to be interpreted as restrictive, which is explained in detail with reference to the drawing. The drawing shows in FIG. 1: a side view of a seat support to which a back-rest is hinged; also depicted are a height-adjustment mechanism for the rear edge of the seat and the back-rest hinge according to the invention; and FIG. 2: a side view, similar to FIG. 1, of a back-rest hinge in another embodiment.

The figures show a seat support 20, which is supported in a well-known manner by a frontal arm 22 and a rear arm 24 at each of its two sides. In practical operation, each of the arms, 22 and 24, is connected to a seat rail of a longitudinal guide well-known in itself. As the figures show, the angle of the rear arm 24 is adjustable; an adjustment device 26 is provided for this purpose. The two rear arms 24 are connected to each other in a revolving joint by a shaft 28 extending transversely; the same holds true of the two frontal arms 22.

A back-rest 30 is hinged to shaft 28; its supporting element is a back-rest support 32. The construction of the latter is well-known in itself; the figure shows only the lower portion of one of the two vertical supports 34. As FIG. 1 shows, in its lower portion this support is attached to shaft 28. Thus shaft 28 constitutes the swivel joint of the back-rest. As FIG. 1 shows, this swivel joint is located in the lower portion of the seat support 20.

According to FIG. 1, a hinge point 36 for a locking lever 38 is formed on support 34, displaced from this swivel joint in the direction of the back-rest 30, i.e. displaced toward the upper edge of the back-rest. As this figure shows, this hinge point is located in the frontal region of support 34. In other words, in the normal, slightly reclining, operating position of the back-rest 30, hinge point 36 is essentially perpendicular above the swivel joint formed by shaft 28.

Locking lever 38 is essentially L-shaped. It consists of a shorter section which extends essentially in the direction of the back-rest 30, the section extending here too, as shown in FIG. 1, essentially vertically, while the back-rest is adjusted to a slightly reclining position, and a longer section which extends essentially in the direction of the seat support 20. For simplicity the first section will subsequently be referred to as vertical shank 40 and the second section will be referred to as horizontal shank 42. This refers literally to the embodiment shown; other embodiments are possible. Thus, the locking lever 38 may in principle also be almost straight, also the hinge point 36 may be located vertically under the swivel joint when the back-rest 30 is in its normal (slightly reclining) position. Finally, the locking lever 38 may also consist of several parts (see below).

As shown in FIG. 1, the horizontal shank 42 is considerably longer than the vertical shank 40. In the embodiment, the ratio between them is between three and four to one. The vertical shank 40 is shorter than the distance between hinge point 36 and the swivel joint. In the embodiment shown, the distance between swivel joint and hinge point 36 is approx. 9 cm; the length of the vertical shank 40 is about 6 cm. By contrast, the total length of the horizontal shank 42 is about 24 cm. The hinge point 36 is located above the seat support 20 in the normal operating position of the back-rest 30. If the back-rest 30 is adjusted to be reclined as far as possible within the permissible range, the hinge point 36 is located roughly at a height that lies along the extension of the upper edge of the seat support 20.

A toothed area 44 is provided on the free end section of the horizontal shank 42, which amounts to about one third of its total length. The teeth point downward, i.e. toward the longitudinal guide (not depicted). Opposite the toothed area 44 a bearing surface 46 is formed on the horizontal shank 42. A bolt mounted to the seat support 20, sits on the bearing surface to form a supportive bearing 48. The bearing surface 46 is bounded on both sides by a pair of stopping faces 50 protruding perpendicularly to its direction. The horizontal shank 42 has constant dimensions between the bearing surface 46 and the toothed area 44, in particular a constant height.

In the locked position which is depicted, a locking lever 52 is in mesh with the toothed area 44; the locking lever has a toothing corresponding to the toothed area 44, with several, for example five to seven, teeth. It is hinged to the seat support 20 swivelling around a shaft 54. An activation lever 56 is associated with it, which is likewise hinged to the seat support 20 swivelling around a shaft 58; however, shaft 58 extends transversely through to the other side of the seat support, thereby connecting the two activation levers 56 on the respective sides of the seat in a rigid revolving joint. The activation lever 56 is essentially V-shaped in the concrete embodiment shown; it has two detent lugs. In the locked position shown, these lugs rest on two detent flanks of the locking lever 52. However, if the activation lever 56 is turned counterclockwise, it no longer blocks the locking lever 52 and the latter can be released, as will be shown in detail later on. In the concrete constructive design shown, a swivelling of the back-rest is possible within a swivel angle of 55°.

The design of the locking components, especially the locking lever 52 and the activation lever 56, is in itself open to choice, and well known from the state of the art for other types of locking mechanisms. Instead of a locking lever 52, a pinion can also be used. Likewise, a pin-wheel adjustment device is possible.

As the figures show, of the several teeth of the locking lever 52, the one located more or less directly opposite the supportive bearing 48 is the one closest to the vertical shank 40. Also, the shaft 54 is located closer to the vertical shank 40 than are the teeth of the locking lever 52. Furthermore, a spring 60 is provided, prestressing the back-rest 30 in a forward direction, i.e. counterclockwise in the figures. The left-hand terminal section of the spring 60 is hooked into the seat support at 62; its right-hand terminal section in the figures acts on the lower end of the vertical shank 40 at 64. Thus, in the specific embodiment shown the spring extends essentially parallel to the horizontal shank 42, but is longer than the latter. Because of the arrangement chosen, it prestresses the blocked locking lever 38 in a clockwise turning direction. In other words, the bearing surface 46 is pressed against the supportive bearing 48 by the spring 60. The back-rest hinge is rendered rattleproof by the spring 60.

If the locking lever 52 is released via the activation lever 56 as described above, the spring 60 pulls the locking lever 38 toward the point of engagement 62. This triggers a counterclockwise turning motion of the locking lever 52, whose toothing is thus released from the toothed area 44 of the horizontal shank 42.

As can be seen from the figures, the parts 38, 52 and 56 are flat component parts which can be punched from sheet steel. The back-rest hinge according to the invention can be produced using very few component parts altogether; these component parts are made exclusively from steel; this circumstance makes it simpler to recycle the entire seat.

The dash-dotted lines in the figures indicate the outline of an upholstery 66. It will be seen that the outline of the upholstery 66 is always in front of (viewed in seating direction) or above the locking lever 38.

Finally, in FIG. 1 a dash-dotted line also indicates a rapid adjustment mechanism of the back-rest 30. This rapid adjustment is an advantageous further development; however, it is not mandatory to provide it.

For rapid adjustment, a bow-shaped curved wing 68 is provided in the support 34 of the back-rest support 32. In the embodiment shown, it is shaped like a circle segment and has a centre that is located above the swivel joint, roughly at the midpoint between the hinge point 36 and the swivel joint. Basically, the wing 68 can also be embodied as a circle segment having the swivel joint as its centre. In that case, the possible angle of the rapid adjustment is smaller than the one in the embodiment shown; however, the locking lever 38 remains at rest during the rapid adjustment. In the embodiment shown, however, the locking lever 38 moves during the rapid adjustment; the locking mechanism described above permits a certain amount of tipping movement within the locked position.

For rapid adjustment of the back-rest, the two hinge points 36 of the two locking levers 38 are attached to each other rigidly and torsion-free by means of a shaft extending transversely; this shaft 70 grips the wing 68 and thus a section of the shaft constitutes the wing piece. In the normal position which is depicted in the figure, the shaft 70 is secured by means of a blocking member 72 in such a way that it lies in the upper end position of the wing 68. In the embodiment shown, the rapid adjustment serves to quickly tip forward the back-rest 30, a well-known process that is used, for example, for getting into the rear seat of a two-door vehicle.

The blocking member 72 has a swivel shaft which is provided on the support 34 and displaced in a V-shape at an acute angle to the course of the wing 68. By means of an activation device not depicted in the figure, for example by means of a Bowden wire, the blocking member 72 can be pulled upwards from the blocking position that is shown; in the process, it is swivelled clockwise. Consequently, its detent lug, which rests on the shaft 70 in the position shown, releases the shaft 70; thus the shaft can be moved within the wing 68.

As the locking of the back-rest hinge according to the invention occurs essentially in the middle of the seat support 20, the locking forces are favourably (in the sense of a latticework) channelled into the frame-shaped seat support 20. When the locking forces are channelled into the vicinity of the swivel joint (the shaft 28), the channelling of the forces is less favourable and to obtain the same rigidity, the seat support 20 must be made more solid than according to the invention.

In its movements, the horizontal shaft 42 of the locking lever 38 remains within the side walls of the seat support 20; thus it requires no additional space to move. As the figure shows, the adjustment mechanism 26 for the rear arm 24 is located between the swivel joint (shaft 28) and the stop of the locking lever 38.

The curvature of the toothed area 44, and thus also of the bearing surface 46, has been chosen so that the locked part of the toothed area retains the orientation that is depicted, independently of the angle to which the back-rest is adjusted. Instead of a curved embodiment, the locking lever 38 may also have two parts; e.g. a straight rack or a threaded rack may be hinged to the endpoint of the reference line for the horizontal shaft.

Figure 2:
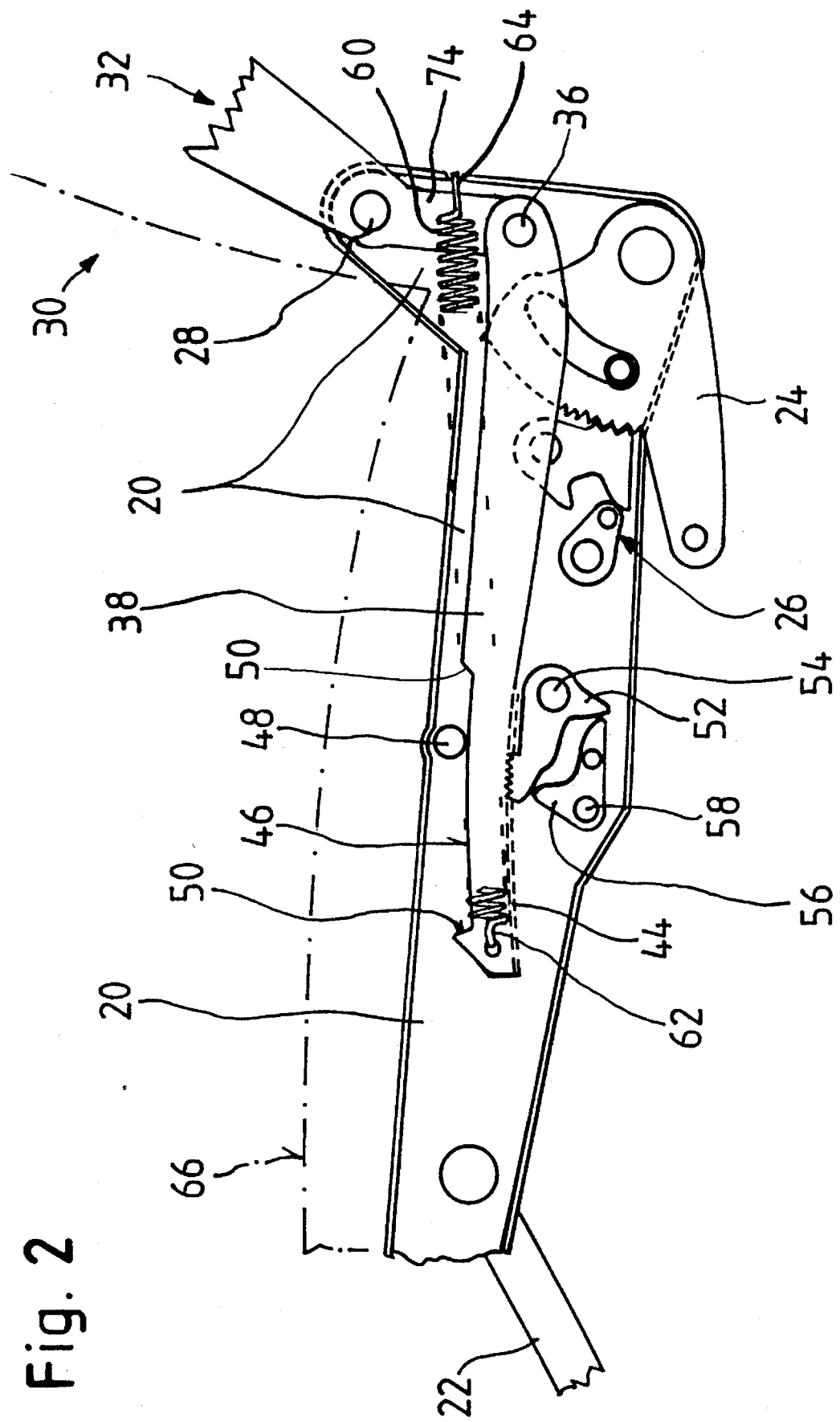

In the embodiment according to FIG. 2, the shaft 28 is not assigned to a lower area of the seat support 20, but instead is located in a specially provided rear raised part of this seat support. In the embodiment shown, it lies in an extension of the upper edge of the upholstery 66. The back-rest support 32 is extended beyond the shaft 28 by means of an extension 74; the hinge point 36 for the locking lever 38 is located on this extension 74. Now the locking lever is no longer, as in FIG. 1, prestressed through pulling, but rather through pressure. This construction makes possible a greater clearance in the areas of the lower legs and feet for passengers sitting behind the vehicle seat according to the invention.

In the embodiment in FIG. 2, the toothed area 44 of the locking lever 38 and the corresponding locking device, consisting of the locking lever 52, the shaft 54, the activation lever 56, and the shaft 58, are unchanged in comparison to the embodiment in FIG. 1. The toothed area 44 and the corresponding associated toothing of the locking lever 52 are selected in very fine gradations; thus an almost continuous adjustment of the back-rest 30 around the shaft 28 becomes possible. With the toothing chosen, unwanted engagement does not occur; when the locking lever 52 is swivelled into the locking position, complete locking is achieved independently of the initial position in each case.

In the embodiment according to FIG. 2, the locking lever 38 is essentially straight-lined; in its lengthwise direction it essentially extends parallel to the lengthwise direction of the seat support 20. According to the constructive implementation, it may be formed in an L-shape in the embodiment according to FIG. 2.

As well in the embodiment according to FIG. 2, too, a rapid adjustment mechanism of the back-rest may be provided, as realised by means of parts 68, 70, and 72 in the embodiment of FIG. 1. However, this shows only one feasible example of rapid adjustment; other implementations are possible.

We claim:

1. Back-rest hinge for a vehicle seat with a back-rest and a seat support, with a back-rest hinged to the seat support by means of a swivel joint and with a locking mechanism for adjusting the angle of inclination of the back-rest in relation to the seat support, said back-rest having a lengthwise direction and comprising a back-rest support, and said locking mechanism comprising a locking lever, wherein the locking lever is hinged to the back-rest support at a hinge point in such a way that the hinge point is at a distance from the swivel joint along the lengthwise direction of the back-rest, the locking lever has a locking area which extends in the longitudinal direction of the seat support, so that a prolongation of the locking area points toward a front edge of this seat support, and interlock means comprising an activation lever is provided on the seat support for releasably fixing the locking area, so that the locking lever cannot move relative to the seat support, which interlock means is normally in interlocking engagement with a locking area and can be released by the activation lever, the locking area being curved so as to retain the orientation of the locking area relative to the interlock means substantially independent of the position of the back-rest.

2. Back-rest hinge according to claim 1, characterised in that the hinge point (36) is located closer to the upper edge of the back-rest (30) than the swivel joint.

3. Back-rest hinge according to claim 1, characterised in that the back-rest (30) has an upper edge distal to the swivel joint and said back-rest support has an extension (74) and that the hinge point (36) of the locking lever (38) is located on the extension and is at a greater distance from the upper edge of the back-rest (38) than is the swivel joint (28).

4. Back-rest hinge according to any of the claim 1, characterised in that the locking area has a constant width and two stopping faces (50).

5. Back-rest hinge according to claim 1, wherein a spring (60) having two ends is provided, one end thereof engaging the locking lever and the other end engaging the seat support, the arrangement being such that the back-rest is preloaded to turn towards the seat carrier and the locking area is prestressed against a supportive bearing.

6. Back-rest hinge according to any of the claim 1, characterised in that the vehicle seat has a height-adjustment device whose control mechanism (26) is provided closer to the rear edge of the seat than the locking area.

7. Back-rest hinge according to claim 1, wherein the locking lever is arranged such that the locking lever during its operational movement stays within the area defined by the back-rest and the seat support.

8. Back-rest hinge according to any of the claim 1, characterised in that the swivel joint (28) is located in an upper section of the seat support (20).

9. Back-rest hinge according to claim 1, characterised in that the extension (74) is shorter than a maximum height of the seat support (20).

10. Back-rest hinge for a vehicle seat with a seat support (20) and a back-rest hinged to it by means of a swivel joint (shaft 28) and a locking mechanism (44 to 58) for adjusting the angle of inclination (30) of the back-rest in relation to the seat support (20), characterized in that a locking lever is hinged to the back-rest at a hingepoint in such a way that the hinge point (36) is at a distance from the swivel point along the lengthwise direction of the back-rest (30), that the locking lever (38) has a locking area which extends in the direction of the seat support (20) and points toward a front edge of this seat support, and that an interlock means is provided on the seat support (20) which interacts with the locking area, can be released, and is normally in mesh (locking lever 52), and with which an activating joint (activation lever 56) is associated, the locking lever (38) being formed in an L-shape and having a vertical shaft (40) which extends essentially parallel to the back-rest and a horizontal shaft (42) which extends essentially parallel to the seat support (20), where the vertical shaft (40) includes the hinge point (36) and the horizontal shaft (42) supports the locking area.

11. Back-rest hinge according to claim 4, characterized in that the horizontal shaft (42) is at least three times as long as the vertical shaft (40).

12. Back-rest hinge according to claim 11, characterized in that the horizontal shaft (42) is four times as long as the vertical shaft (40).

13. Back-rest hinge for a vehicle seat with a seat support (20) and a back-rest hinged to it by means of a swivel joint (shaft 28) and a locking mechanism (44 to 58) for adjusting the angle of inclination (30) of the back-rest in relation to the seat support (20), characterized in that a locking lever is hinged to the back-rest at a hinge point in such a way that the hinge point (36) is at a distance from the swivel joint along the lengthwise direction of the back-rest (30), that the locking lever (38) has a locking area which extends in the direction of the seat support (20) and points toward a front edge of this seat support, and that an interlock means is provided on the seat support (20) which interacts with the locking area, can be released, and is normally in mesh (locking lever 52), and with which an activating joint (activation lever 56) is associated, the vertical shaft (40) having a length amounting to 50 to 100% of the distance from the swivel joint to the hinge point (36).

14. Back-rest hinge according to claim 7, characterized in that the locking area has a toothed area (44) along its lower side, and that opposing the toothed area a supportive bearing (48) for gliding contact of the opposite side of the locking area is provided on the seat support (20).

15. Back-rest hinge according to claim 8, said locking area having a toothed area (44) along its upper side.

16. Back-rest hinge for a vehicle seat with a seat support (20) and a back-rest hinged to it by means of a swivel joint (shaft 28) and a locking mechanism (44 to 58) for adjusting the angle of inclination (30) of the back-rest in relation to the seat support (20), characterized in that a locking lever is hinged to the back-rest at a hinge point in such a way that the hinge point (36) is at a distance from the swivel joint along the lengthwise direction of the back-rest (30), that the locking lever (38) has a locking area which extends in the direction of the seat support (20) and points toward a front edge of this seat support, and that an interlock means is provided on the seat support (20) which interacts with the locking area, can be released, and is normally in mesh (locking lever 52), and with which an activating joint (activation lever 56) is associated, the back-rest (30) having a back-rest support (32), an arcuate slot (68) being provided in said back-rest support for a rapid adjustment of said back-rest (30), a locking lever (38) having a shaft (70) which is slidably mounted within said slot (68), and a releasable blocking member (72) being provided on said back-rest support (32) which secures said shaft (70) to one end of said slot (68).

17. Back-rest hinge for a vehicle seat with a seat support (20) and a back-rest hinged to it by means of a swivel joint (shaft 28) and a locking mechanism (44 to 58) for adjusting the angle of inclination (30) of the back-rest in relation to the seat support (20), characterized in that a locking lever is hinged to the back-rest at a hinge point in such a way that the hinge point (36) is at a distance from the swivel joint along the lengthwise direction of the back-rest (30) that the locking lever (38) has a locking area which extends in the direction of the seat support (20) and points toward a front edge of this seat support, and that an interlock means is provided on the seat support (20) which interacts with the locking area, can be released, and is normally in mesh (locking lever 52), and with which an activating joint (activation lever 56) is associated, the vertical shaft (40) having a length amounting to 50 to 100% of the distance from the swivel joint to the hinge point (36), the locking area being curved around a virtual focus point which is displaced forward by the effective length of the locking lever (38) and corresponds to the swivel joint.

* * * * *